(12) United States Patent
Uehara

(10) Patent No.: US 7,857,528 B2
(45) Date of Patent: Dec. 28, 2010

(54) LENS BARREL AND IMAGING APPARATUS

(75) Inventor: Takumi Uehara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/556,806

(22) Filed: Sep. 10, 2009

(65) Prior Publication Data

US 2010/0061713 A1    Mar. 11, 2010

(30) Foreign Application Priority Data

Sep. 11, 2008    (JP) .............................. 2008-232879

(51) Int. Cl.
*G03B 17/00* (2006.01)
(52) U.S. Cl. ...................... 396/439; 396/448
(58) Field of Classification Search ................. 396/439, 396/448

See application file for complete search history.

(56) References Cited

U.S. PATENT DOCUMENTS

| | | | | |
|---|---|---|---|---|
| 4,989,027 A | * | 1/1991 | Ishii et al. ................... | 396/448 |
| 5,614,973 A | * | 3/1997 | Azegami ..................... | 396/448 |
| 7,390,132 B2 | * | 6/2008 | Tada et al. .................. | 396/448 |
| 2006/0098975 A1 | * | 5/2006 | Kobayashi .................. | 396/448 |
| 2007/0196102 A1 | * | 8/2007 | Miyoshi ..................... | 396/448 |
| 2008/0037144 A1 | | 2/2008 | Uehara | |

FOREIGN PATENT DOCUMENTS

| | | |
|---|---|---|
| JP | 7-159856 | 6/1995 |
| JP | 2008-033153 | 2/2008 |

* cited by examiner

*Primary Examiner*—Rodney E Fuller
(74) *Attorney, Agent, or Firm*—Canon USA Inc IP Div

(57) ABSTRACT

A lens barrel is configured so as to rotatably support lens barriers by a barrier drive member that rotates around an optical axis and the lens barriers rotate and revolve on an axis when the lens barriers are opened and closed. The lens barrel includes wall units provided on an inner circumference portion facing to a space where the lens barriers of the lens barrel member operates, and convexes provided on surfaces of the lens barriers adjacent to the inner circumference portion of the lens barrel member. When the lens barriers are held at a barrier opening position and the barrier drive member is moved to a driving member closing position, the wall units are brought into contact with the convexes and the lens barriers are forcibly closed.

6 Claims, 8 Drawing Sheets

LENS BARREL AND IMAGING APPARATUS

BACKGROUND OF THE INVENTION

1. Field of the Invention

The present invention relates to a lens barrel and an imaging apparatus including openable/closable lens barriers which are provided in front of an imaging optical system in order to protect the imaging optical system.

2. Description of the Related Art

A conventional barrier device is, for example, discussed in Japanese Patent Laid-open No. 07-159856. The conventional barrier device includes a plurality of pieces of lens barriers which are rotatably supported by a lens barrel for holding a lens and a barrier drive ring which rotates around an optical axis to open and close the lens barriers. Further, the conventional barrier device includes barrier closing springs which are provided between the lens barriers and the barrier drive ring to allow the lens barriers to be constantly in contact with the barrier drive ring in order to bias the lens barriers in a closing direction of the lens barriers and which absorb an escaping movement of the barrier drive ring with respect to the lens barriers. Still further, the conventional barrier device includes barrier opening springs which are provided between the barrier drive ring and a lens barrel cover to bias the barrier drive ring in order to drive the lens barriers in an opening direction, and a connecting shaft which transmits a rotational force of a rotational barrel to the barrier drive ring.

Actions of the conventional barrier device having the above described configuration will be described below. A clockwise rotation of the rotational barrel serves to transmit a rotational force of the rotational barrel to a barrier drive ring through the connecting shaft. The barrier drive ring, upon receiving the rotational force, rotates in the clockwise direction with the barrier opening springs charged. The lens barriers rotate in a counter-clockwise direction following the barrier drive ring subject to the barrier closing springs as the barrier drive ring rotates in the clockwise direction. The lens barriers cover a front surface of the image optical system while the lens barriers rotate in the counter-clockwise direction. While the rotational barrel rotates in the counter-clockwise direction, a contacting portion between the rotational barrel and the connecting shaft is brought into a free movement.

The barrier drive ring rotates in the counter-clockwise direction due to a biasing force of the barrier opening springs having been charged. The lens barriers rotate in the clockwise direction as the barrier drive ring rotates in the counter-clockwise direction. The lens barriers cause the front surface of the imaging optical system to open owing to the rotation of the lens barriers. When the lens barriers are completely opened, the lens barriers are brought into contact with stoppers, which block their rotation in the clockwise direction. As a result, the barrier drive ring stops rotating.

For the sake of downsizing of the camera, shortening of an entire length of the lens barrel including the barrier device is effective. Therefore, an accommodation space for the lens barriers is effectively used when the barriers are in an opening state. For example, a barrier device as taught in Japanese Patent Laid-open No. 2008-033153 includes a space for accommodating the lens barriers while the lens barriers are open. When a lens barrel is in a retracted state, members of the lens barrel other than the lens barriers come into the accommodation space. At that time, the lens barriers are retreated from the accommodation space to be placed in a barrier closing state. Accordingly, the accommodation space for the lens barriers can be used effectively when the lens barrel is brought into the retracted state, and thus a thinner lens barrel can be obtained.

In the barrier device having the above described configuration, however, the lens barriers may interfere with the other members coming into the lens barrier accommodation space if the lens barriers cannot be closed only with the biasing force of the barrier closing springs because of, for example, a sticking foreign material on the lens barriers during the retracting movement of the lens barrel. In view of the above, in Japanese Patent Laid-open No. 2008-033153, contact units for closing the lens barriers, are provided on the barrier drive ring which presses the lens barriers in the opening direction during an opening movement of the lens barriers. The contact units press the lens barriers in the closing direction to forcibly drive the lens barriers in the closing direction if the foreign material or the like is stuck on the lens barriers and the barriers cannot be closed only with the biasing force of the barrier closing springs. Accordingly, the lens barriers are prevented from interfering with the other members of the lens barrel.

However, the barrier device of Japanese Patent Laid-open No. 2008-033153 has such a configuration that a relative movement between the lens barriers and a barrier drive member forcibly drives the lens barriers in the closing direction. The above described configuration is not applicable to a barrier device in which the lens barrier is supported by the barrier drive member in a rotational manner and the lens barriers moves in synchronization with the barrier drive member when the barrier drive member rotates from its position at the time of opening the lens barriers to its position at the time of closing the lens barriers. This is because, in the above described barrier device, the lens barriers could not be closed forcibly by the barrier drive ring since the barrier drive ring did not move relative to the lens barriers.

SUMMARY OF THE INVENTION

The present invention is directed to a lens barrel and an imaging apparatus capable of forcibly moving lens barriers in a closing direction of the lens barriers even if the lens barriers are supported by a barrier drive member.

According to an aspect of the present invention, a lens barrel includes an imaging optical system, lens barriers configured to move between a barrier closing position at which the lens barriers cover a photographing opening arranged on an optical axis of the imaging optical system and a barrier opening position at which the lens barriers are retreated from the photographing opening, a barrier drive member configured to rotatably support the lens barriers, and rotate around the optical axis so as to move between a driving member closing position at which the lens barriers are positioned at the barrier closing position and a driving member opening position at which the lens barriers are positioned at the barrier opening position, a lens barrel member configured to rotatably hold the barrier drive member between the driving member opening position and the driving member closing position, and contact units configured to be free from the lens barriers when the lens barriers are positioned at the barrier closing position and to move the lens barriers in a direction of the barrier closing position in contact with the lens barriers when the lens barriers are positioned at the barrier opening position and the barrier drive member is positioned at the drive member closing position.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENT

Figure 1:
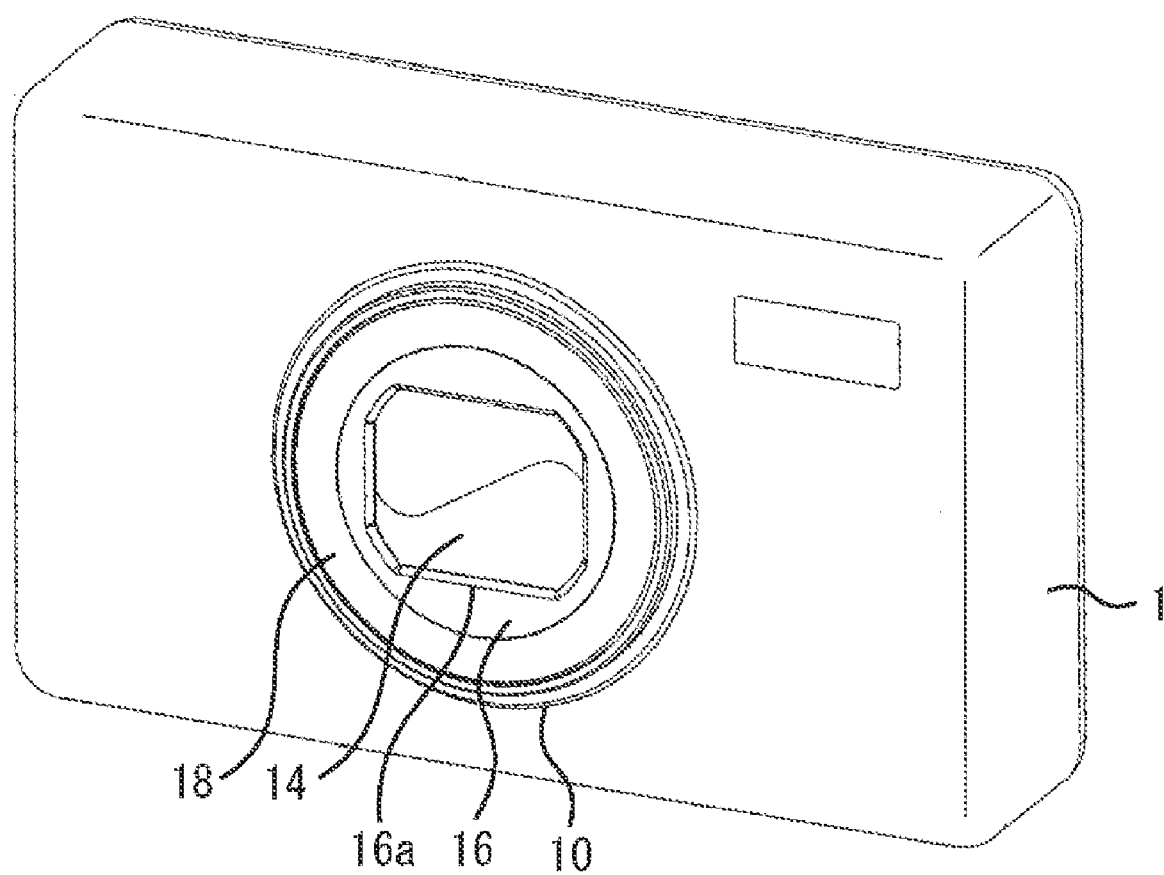
FIG. 1 illustrates a camera including a lens barrel with a barrier device according to an exemplary embodiment of the present invention.
Figure 1:
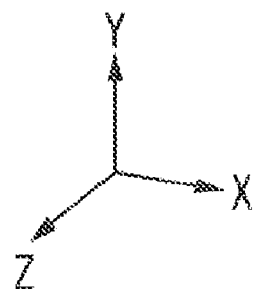

Various exemplary embodiments, features, and aspects of the invention will be described in detail below with reference to the drawings.

Description will be made below using specific shapes, configurations, and the like of the present invention, which, however, can be changed as required.

In the drawings, to clarify the corresponding relations among the drawings and to understand the drawings easily, without specifying an original point, a coordinate system for indicating directions are represented by an X-Y-Z orthogonal coordination, in which a Y-plus direction is an upper direction when the camera is in a normal position. In the normal position, a camera is positioned such that an optical axis in an imaging optical system of a lens barrel 10 (hereinafter simply referred to as the "optical axis") extends in a horizontal direction and a longitudinal side of a photographing screen goes in the horizontal direction. Hereinafter, a Y-plus indicates an upper direction and a Z-plus (i.e., an optical axis object direction) indicates a front direction.

FIG. 1 illustrates an exemplary embodiment of a camera including a lens barrel with a barrier device according to the present invention.

A camera 1 of the present exemplary embodiment is a digital camera including therein an image capturing unit (not shown) for capturing an object image, wherein a lens barrel 10 having an imaging optical system for forming an image of the object in the image capturing unit is disposed about a center of the digital camera.

The lens barrel 10 is a retract type (retractable lens structure) lens barrel. The lens barrel 10 is in a retracted state, i.e., the lens barrel 10 is accommodated in the camera 1 in a manner illustrated in FIG. 1 when an electric source of the camera 1 is in an off state. In this retracted state, the lens barriers 14 are in a closing position where the lens barriers 14 cover the imaging optical system to protect a front surface of the imaging optical system.

Figure 2:
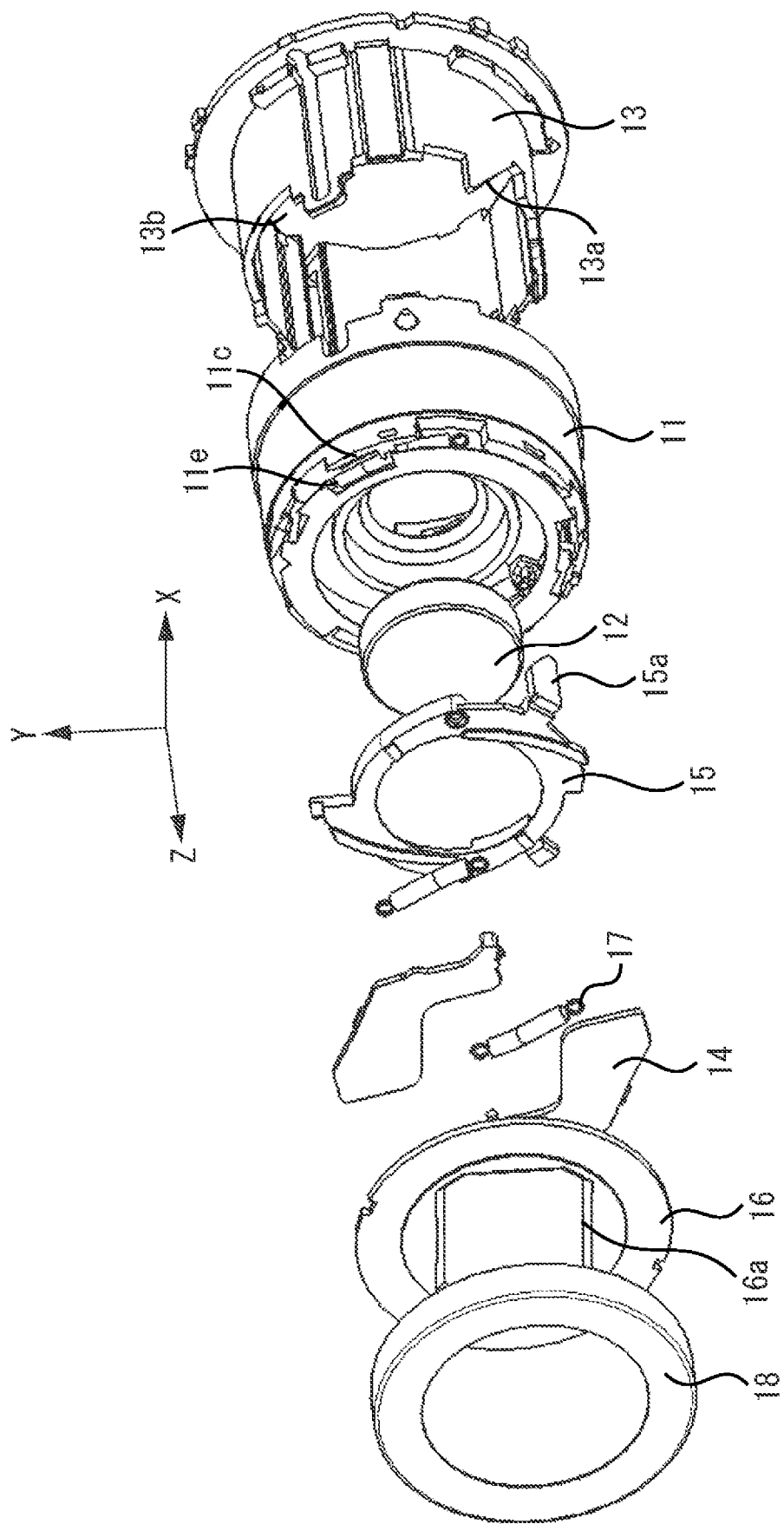
FIG. 2 is an exploded perspective view illustrating parts relating to the barrier device of the lens barrel.

FIG. 2 is an exploded perspective view illustrating portions relating to a barrier device of the lens barrel 10.

The lens barrel 10 includes a lens barrel member 11, a photographic lens 12, a rectilinear motion tube 13, lens barriers 14, a barrier drive member 15, a barrier cover 16, barrier drive springs 17, and a decorative laminate 18. The lens barrel 10 includes, in addition to the above described members, an optical lens and various members for holding and driving the optical lens; however, a description of them will be omitted here.

The lens barrel member 11 holds the photographic lens 12. The lens barrel member 11 retracts and advances the photographic lens 12 in an optical axis direction under actions of the other drive mechanism members, which are not shown, in response to operations of a photographer.

The lens barrel member 11 is provided with holes 11c which pierce through the lens barrel member 11 in a direction along the optical axis. Rectilinear guiding units 13b (which will be described below) of the rectilinear motion tube 13 pass through the holes 11c when the lens barrel member 11 is retracted.

Further, on a Z-plus side of the lens barrel member 11, spring hooking units lie are provided.

The photographic lens 12 is an optical lens as a part of the imaging optical system. The photographic lens 12 constitutes the imaging optical system together with the other optical lens (not shown).

The rectilinear motion tube 13 is a moving member provided at an inside of the lens barrel member 11. The rectilinear motion tube 13 controls a rotation of the lens barrel member 11.

The lens barrel member 11 and the rectilinear motion tube 13 relatively move along the optical axis direction as the lens barrel member 11 is retracted or advanced. A distance between the lens barrel member 11 and the rectilinear motion tube 13 becomes larger in a photographing mode, whereas the distance between the lens barrel member 11 and the rectilinear motion tube 13 becomes smaller when the lens barrel member 11 is in a retracted state. A front side of the lens barrel member 11 has a shape which enables ensuring of an accommodation space, which will be described below.

Parts of the rectilinear motion tube 13 are provided with rectilinear guiding units 13b for rectilinearly guiding lens holding members (not shown) such that a part of the rectilinear motion tube 13 is extended forwardly (toward a Z-plus side). The rectilinear guiding units 13b pass through the holes 11c of the lens barrel member 11 to come into the accommodation space, which will be described below.

An end portion of a front side of the rectilinear motion tube 13 is provided with cam surfaces 13a.

The lens barriers 14 are disposed between the barrier drive member 15 and the barrier cover 16 in one end of a direction along the optical axis of the imaging optical system, i.e., in a front side. The lens barriers 14 move in an openable/closable manner between a barrier closing position at which the lens barriers cover the photographing opening 16a (which will be described below) and a barrier opening position at which the lens barriers are retreated from the photographing opening. Thus, the lens barriers 14 are also called barrier blades.

Total two pieces of lens barriers 14, having the same shapes, are arranged at each point-symmetric position centering on the optical axis.

Figure 3A:
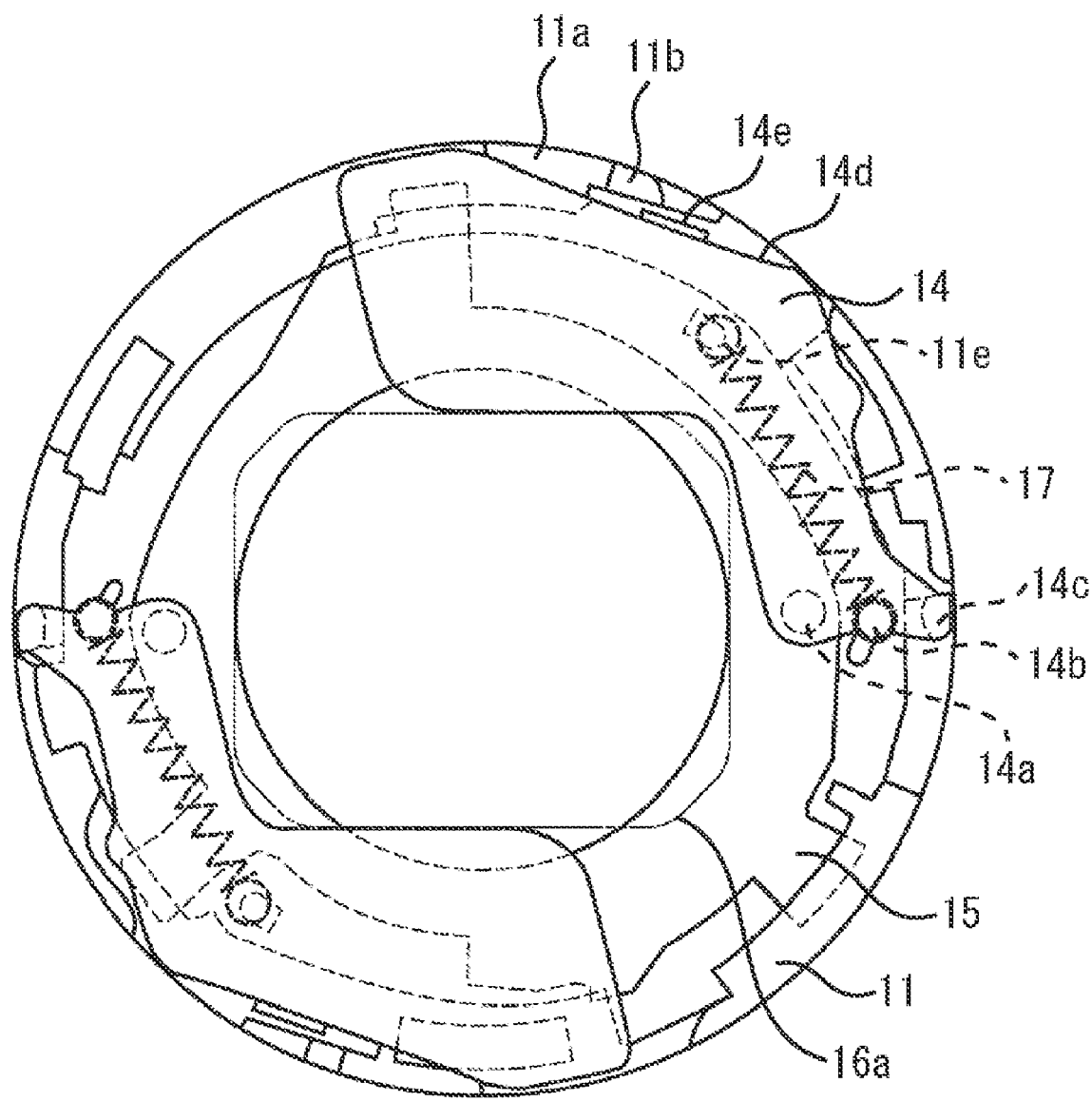
FIG. 3A is an elevation view illustrating an opening state of the barrier device of the lens barrel.
Figure 3A:
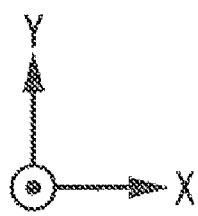

Each of the lens barriers 14 includes a rotational shaft 14a, a spring hooking unit 14b, and a lens barrel hooking unit 14c (see FIG. 3A and the others). The above described components are arranged in the order of the rotational shaft 14a, the spring hooking unit 14b, and the lens barrel hooking unit 14c from the optical axis.

Each of the lens barriers 14 is rotatably supported at the rotational shaft 14a relative to the barrier drive member 15.

Each of barrier drive springs 17 is hooked on the spring hooking unit 14b and thus biasing the spring hooking unit 14b in the counter-clockwise direction (viewed from the front side, i.e., in a direction viewing from the Z-plus side, the same in the following description) around the rotational shaft 14a.

Each of the lens barrel hooking units 14c projects toward a side of the lens barrel member 11 (toward a Z-minus side) such that the lens barrel hooking unit 14c hooks the lens barrel member 11 when the lens barriers 14 are opened.

The barrier drive member 15 is provided in front of the lens barrel member 11 and supported so as to be rotatable relative to the lens barrel member 11.

The barrier drive member 15 holds the lens barriers 14 as well as drives the lens barriers 14.

The barrier drive member 15 includes a cam surface 15a at an end of a portion projecting toward a rectilinear motion tube 13 (Z-minus side). The cam surface 15a contacts a cam surface 13a of the rectilinear motion tube 13 when the lens barrel member is retracted. The cam surface 15a converts a straight movement generated when the lens barrel member is retracted into a rotational drive force, thereby rotating the barrier drive member 15.

A position of the barrier drive member 15 when the lens barriers 14 are opened is referred to as the "driving member opening position" and a position of the barrier drive member 15 when the lens barrel member 11 is retreated and the lens barriers 14 are closed is referred to as the "driving member closing position".

The barrier cover 16 is provided with the photographing opening 16a at a center on the optical axis and is disposed in front of the lens barriers 14. The photographing opening 16a is covered by the lens barriers 14 when the lens barrel member 11 is retracted. The lens barriers 14 are retreated from the photographing opening 16a to expose the photographing opening 16a when the camera is operated, thereby allowing photographing light flux to pass through the photographing opening 16a.

When the lens barriers 14 are opened, the accommodation space for accommodating the lens barriers 14 is formed behind the barrier cover 16. The lens barriers 14 move from the accommodation space to the barrier closing position when the lens barrel 10 is retracted.

The barrier drive spring 17 is a tension coil spring which is bridged and stretched between the spring hooking unit 11e of the lens barrel member 11 and the spring hooking unit 14b of the lens barrier 14.

Each of the barrier drive springs 17 biases the corresponding lens barrier 14 in the counter-clockwise direction around the corresponding rotational shaft 14a (in a direction of the barrier closing position).

The decorative laminated sheet 18 is disposed in front of the barrier cover 16 in order to cover a holding unit and a positioning unit of the barrier cover 16.

According to the above described configuration, when the lens barrel 10 is retracted, the cam surface 13a of the rectilinear motion tube 13 is brought into contact with the cam surface 15a of the barrier drive member 15. Accordingly, the lens barrel 10 is forcibly rotated in the clockwise direction while charging the barrier drive member 15 and the barrier drive springs 17 and is placed at a "driving member closing position", thereby closing the lens barriers 14.

On the other hand, when the lens barrel member 11 is advanced, the cam surface 13a of the rectilinear motion tube 13 comes off from the cam surface 15a of the barrier drive member 15. Then, the biasing force of the barrier drive springs 17 (which will be described later in detail) causes the barrier drive member 15 to rotate in the counter-clockwise direction, thereby placing the barrier drive member 15 at a "driving member opening position", resulting in opening the lens barriers 14. Further, the counter-clockwise rotation of the barrier drive member 15 serves to release the charged barrier drive springs 17.

Now, actions of the barrier device will be described in detail with reference to FIGS. 3A through 7.

In FIGS. 3A through 7, the lens 12, the rectilinear motion tube 13, the barrier cover 16, the decorative laminated sheet 18, and the other configurations which are not directly relating to the present invention are omitted. Specifically, in FIGS. 3B through 7, configurations which are not directly relating to the present invention are further simplified with respect to the lens barrel member 11 to facilitate visualization and more easily understand the drawings.

FIG. 3A is an elevation view illustrating the advanced lens barrel member 11 and the lens barriers 14 which is completely open (hereinafter referred to as the "opening state").

Figure 3B:
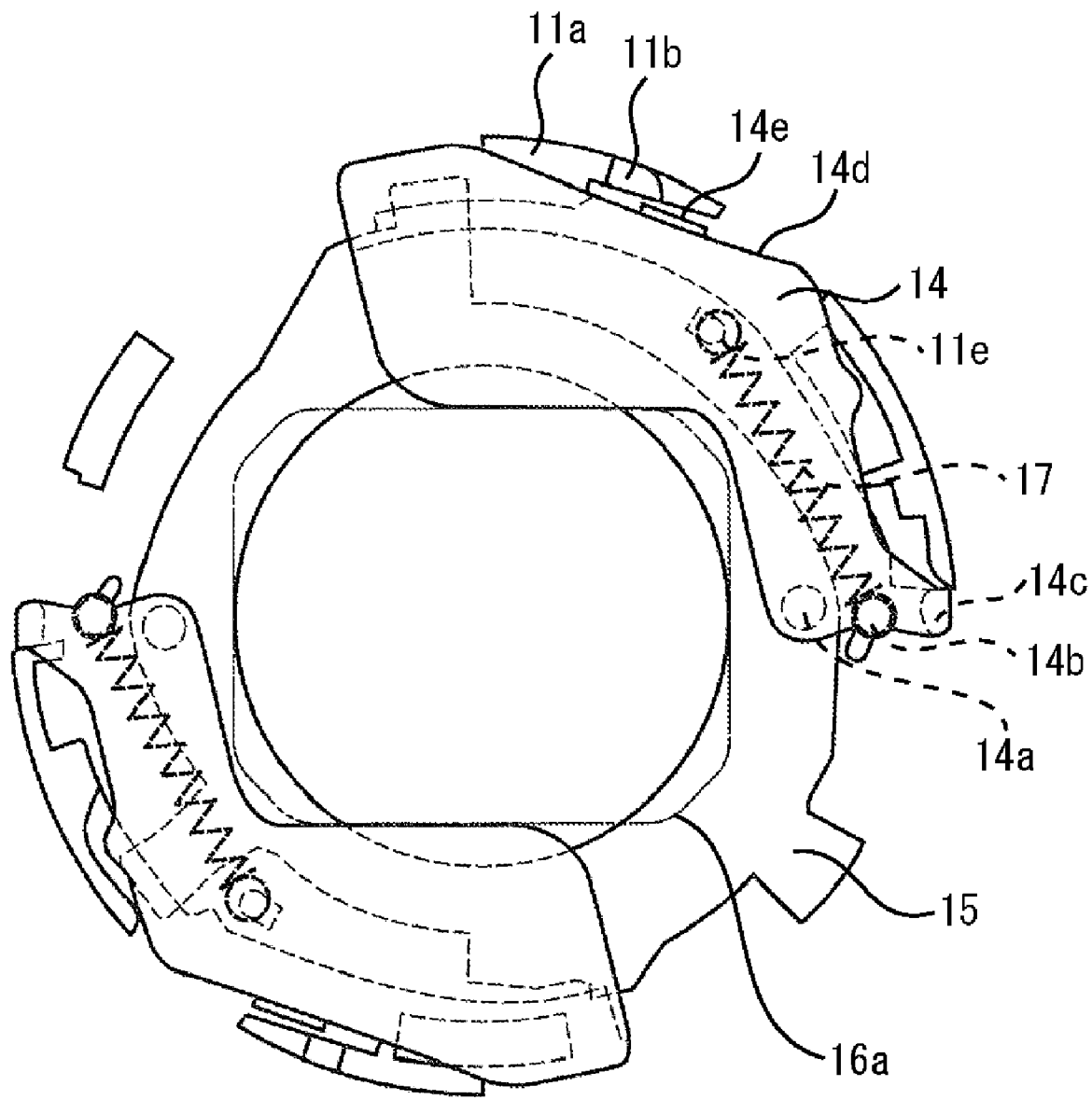
FIG. 3B is a simplified diagram of FIG. 3A.

FIG. 3B is a more simplified elevation view of FIG. 3A.

Since the cam surface 15a of the barrier drive member 15 is completely free from the cam surface 13a of the rectilinear motion tube 13 in the opening state, the action of the barrier drive member 15 is not disturbed in the rotational direction but can rotate freely. Each of the lens barriers 14 is biased by the corresponding barrier drive spring 17 at the spring hooking units 14b. Each of the rotational shaft 14a provided at a position nearer to the optical axis than the spring hooking unit 14b can move freely in a circumference direction around the optical axis according to the rotation of the barrier drive member 15 in a manner as described above. A lens barrel hooking unit 14c positioned outside the spring hooking unit 14b is hooked on the lens barrel member 11 so as to act against the biasing force of the barrier drive spring 17. Therefore, in the lens barrier 14, a rotation torque arises in the clockwise direction around about the lens barrel hooking unit 14c, i.e., an opening force. An end surface 14d of the lens barrier 14 contacts an opening stopper 11a provided on the lens barrel member 11 and thus the lens barrier 14 is kept in the barrier opening position. In a state where the lens barriers 14 are opened, the lens barriers 14 are retreated to the outside of the photographing opening 16a (shown by a double dot-dashed line in FIGS. 3A and 3B).

The end surface 14d of the lens barrier 14 is provided with a gate mark 14e which has been generated while the lens barrier 14 is resin molded. However, the opening stopper 11a contacts the end surface 14d at a position avoiding the gate mark 14e.

A positioning unit 11b for the lens barrel member 11 and a barrier cover 16 (not shown) is provided on the lens barrel member 11.

A region enclosed by the end surface 14d of the lens barrier 14 and an outer circumference of the lens barrel member 11 is provided with the above described opening stopper 11a, the gate mark 14e, and the positioning unit 11b of the barrier cover.

A length of the barrier drive spring 17 becomes shortest in the opening state, such that a charging amount of the barrier drive spring 17 becomes minimum in this state.

Figure 4:
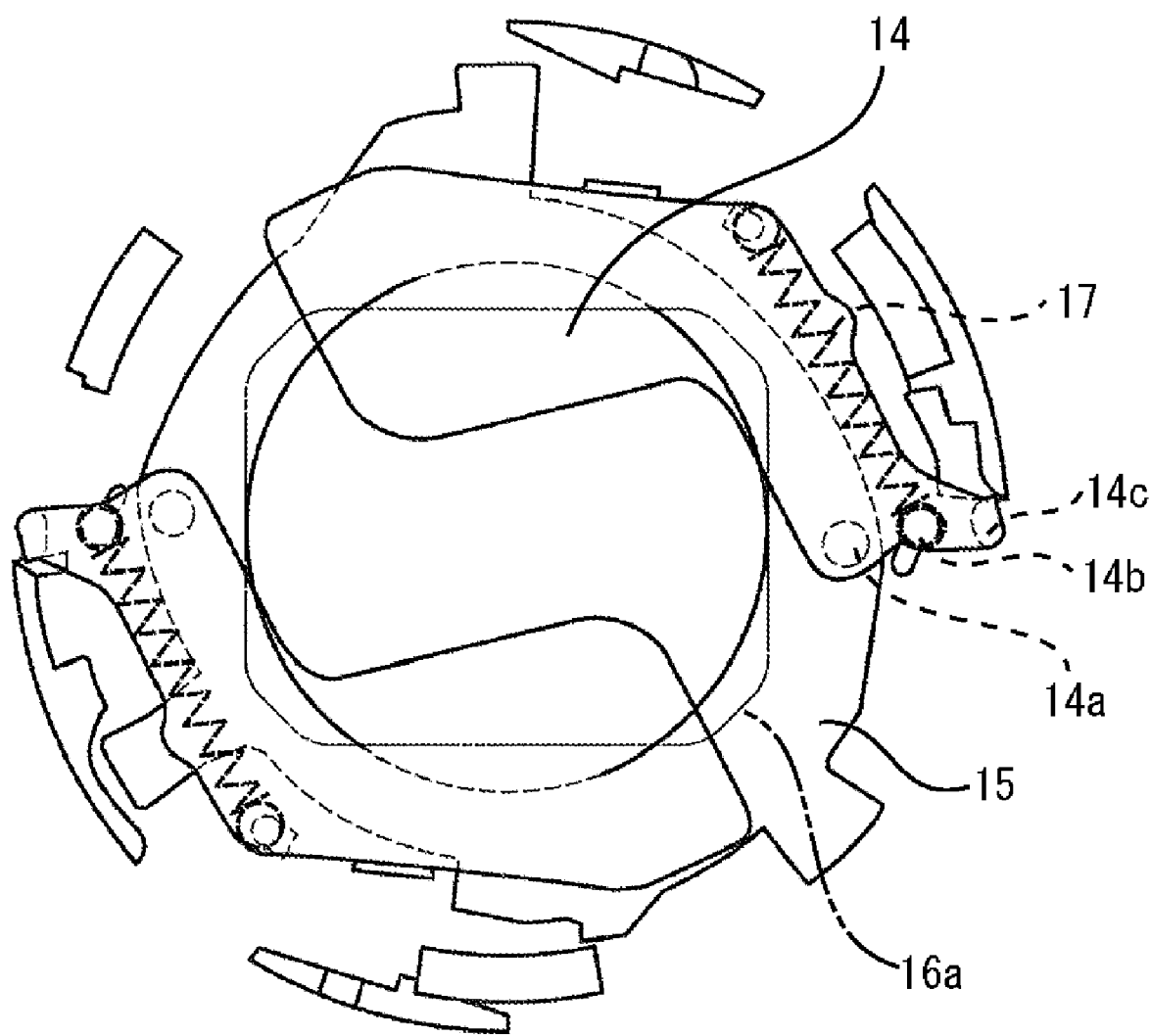
FIG. 4 is an elevation view illustrating a half-way state of the barrier device of the lens barrel.
Figure 4:
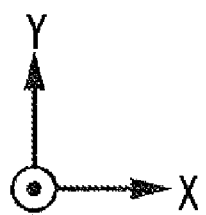

FIG. 4 is an elevation view illustrating a half-way state in which the lens barrel member 11 is retracted and the lens barriers 14 shifts from its opening state to its closing state (hereinafter referred to as the "half-way state").

In the half-way state, since the barrier drive member 15 and the rectilinear motion tube 13 are relatively moving so as to be closer to each other in comparison with a state in which the lens barrel member 11 is advancing, the cam surface 13a of the rectilinear motion tube 13 contacts the cam surface 15a of the barrier drive member 15. Therefore, actions of the cam surfaces forcibly rotate the barrier drive member 15 in the clockwise direction.

The lens barriers 14 move in the clockwise direction around the optical axis subject to the rotation of the barrier drive member 15 in the clockwise direction. On the other hand, since the lens barriers 14 receives the biasing force of the barrier drive springs 17, the lens barriers 14 rotate in the counter-clockwise direction up to a position where the respective lens barrel hooking units 14c is hooked on the lens barrel member 11. In other words, the lens barriers 14 revolve in the clockwise direction around the optical axis while rotating in the counter-clockwise direction on the respective rotational shafts 14a. Since the lens barriers 14 rotate in the counter-clockwise direction on the respective rotational shafts 14a, each of the barrier drive springs 17 is stretched longer than the length in the opening state. As such, the charging amount of the respective barrier drive springs 17 becomes larger.

Figure 5:
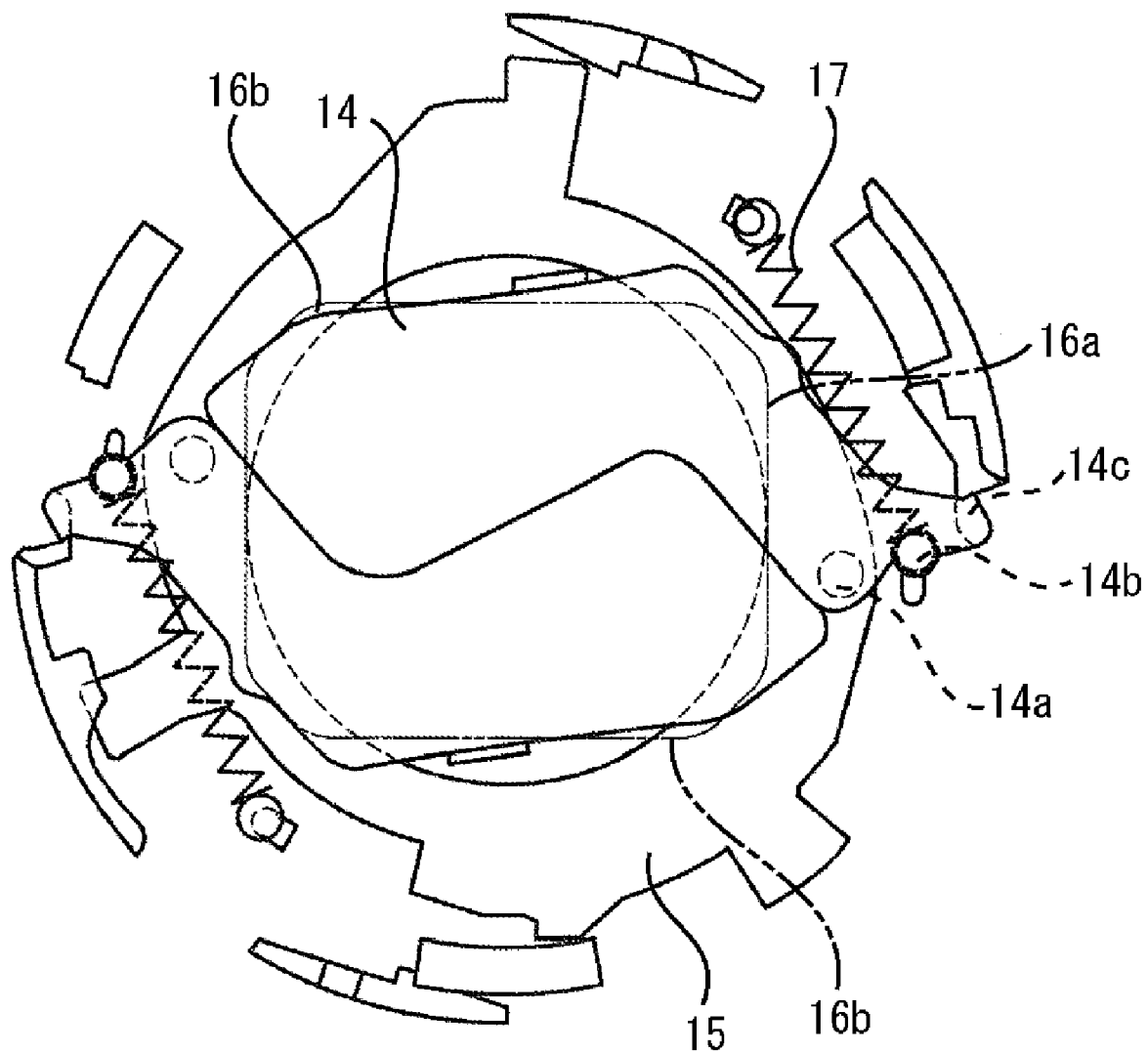
FIG. 5 is an elevation view illustrating a mating state of the barrier device of the lens barrel.

FIG. 5 is an elevation view illustrating a state in which the lens barrel member 11 is further retracted and two mating edges of the lens barriers 14 contact each other to be in a completely mating state (hereinafter referred to as the "mating state").

In the mating state, the barrier drive member 15 further rotates in the clockwise direction, such that the lens barriers 14 contact each other with their blades to shield a central area of the photographing opening 16a. At the time, outer end surfaces adjacent to the ends of the lens barriers 14 come into an inside of the photographing opening 16a (an optical axis side), and therefore, two spaces 16b are created at corners of the photographing opening 16a. The outer end surfaces of the lens barriers 14 which come into the inside of the photographing opening 16a are positioned nearest to the outer circumference of the lens barrel member 11 in the opening state, which actually decides a diameter of the barrier device.

In the conventional barrier device having rotational shafts of the lens barriers in the lens barrel member, the above described state corresponds to the barrier closing state.

Figure 6:
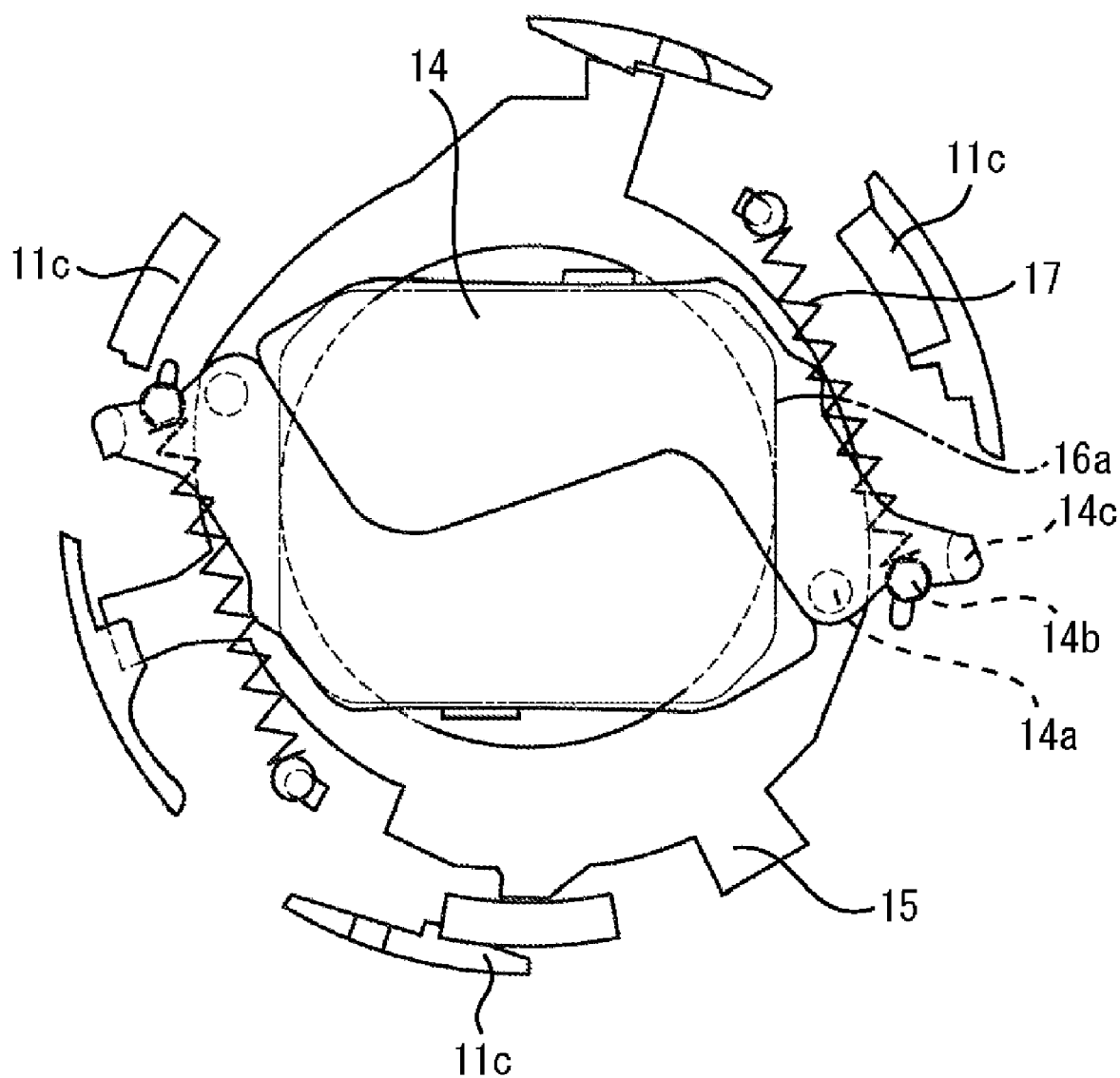
FIG. 6 is an elevation view illustrating a closing state of the barrier device of the lens barrel.

FIG. 6 is an elevation view illustrating a state that the lens barrel member 11 reaches a retracting end and thus the lens barriers 14 are completely closed (hereinafter referred to as the "closing state").

In the closing state, the barrier drive member 15 is positioned at the "driving member closing position" where the barrier drive member 15 has rotated in the clockwise direction as far as possible. One of the lens barriers 14 is rotationally biased in the counter-clockwise direction (in a direction of the barrier closing position) around the corresponding rotational shaft 14a due to the biasing force of the corresponding barrier drive spring 17. However, since the one of the lens barriers 14 contacts another lens barrier 14, rotation in the counter-clockwise direction of the lens barrier 14 is controlled. Further, each of the lens barriers 14 rotates in the clockwise direction around the optical axis together with the barrier drive member 15 while the lens barriers 14 move from the mating state to the closing state. As a result, the spaces 16b created in the corners of the barrier opening are completely shielded by the lens barriers 14. Further, since the lens barriers 14 are rotated in the clockwise direction around the optical axis, the barrier drive springs 17 are stretched further, so that a charging amount increases.

Three holes 11c are formed on the outer circumference of the lens barrel member 11. The rectilinear guiding units 13b formed on the rectilinear motion tube 13 come into or go out through those three holes 11c. When the lens barrel is retracted, the rectilinear guiding units 13b come into the accommodation space, where the lens barriers 14 are accommodated, through the holes 11c as the lens barriers 14 move from the barrier opening position to the barrier closing position. Accordingly, the accommodation space in the opening state can be effectively utilized while the lens barrel is retracted, thereby shortening the entire length of the lens barrel when it is retracted.

Now, a case will be described where a foreign material sticks on the lens barriers 14, which prevents the lens barriers 14 from closing only with the biasing force of the barrier drive springs 17 when the lens barrel member 11 is retracted.

Figure 7:
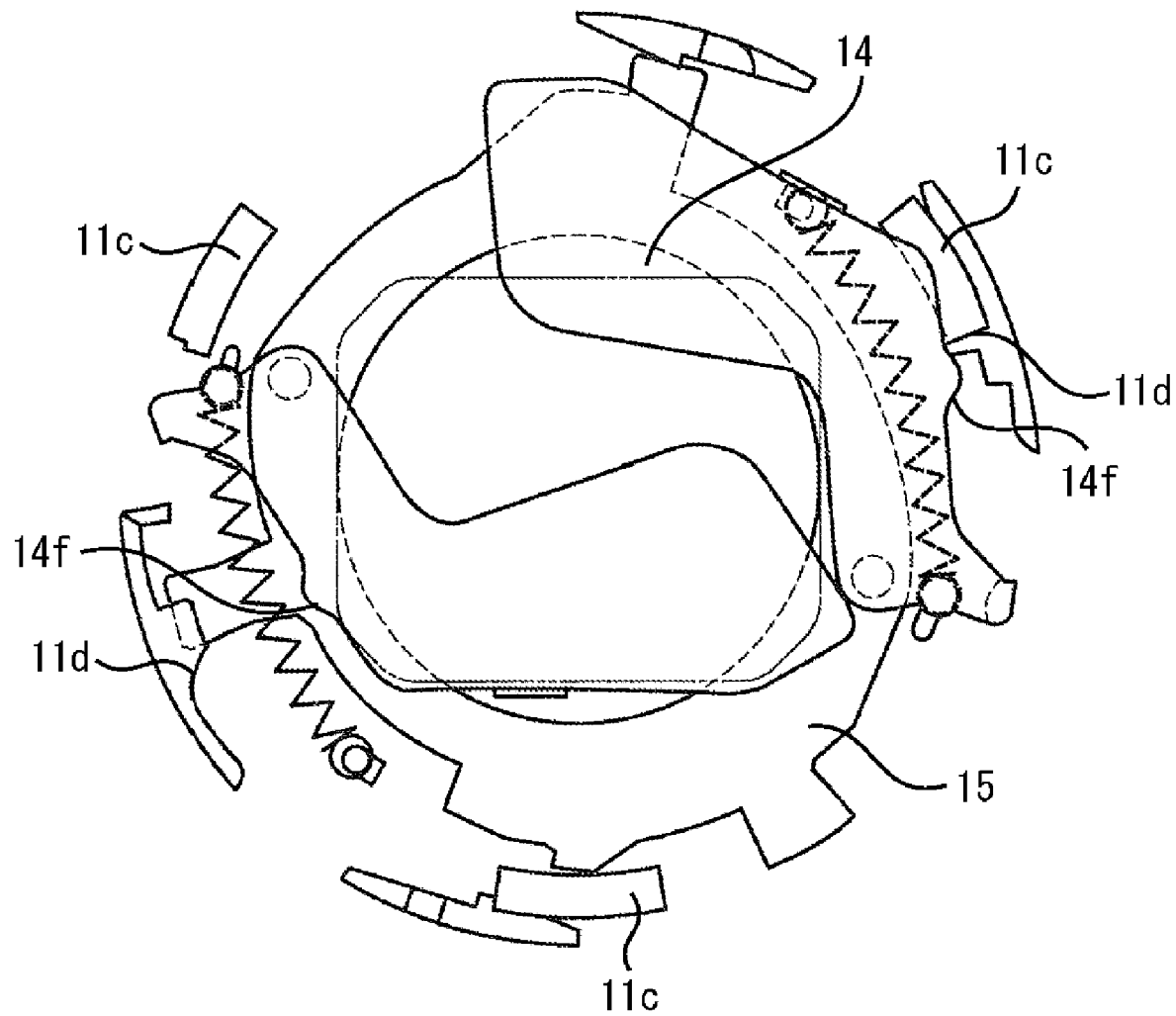
FIG. 7 illustrates a state that the lens barrel member is retracted while the barrier device cannot rotate in the closing direction only with a biasing force of barrier drive springs because of a sticking foreign material such as sand on an upper lens barrier of the barrier device.

FIG. 7 illustrates a state in which the lens barrel member 11 is retracted while the foreign material such as sand sticks on the upper lens barrier of the lens barriers 14, which prevents the upper lens barrier from rotating in the closing direction only with the force of the barrier drive spring 17.

FIG. 7 illustrates a state in which the lens barrel member 11 is retracted, and the barrier drive member 15 is forcibly rotated and placed at the driving member closing position by the rectilinear motion tube 13.

An inner circumference portion of the lens barrel member 11 facing to a space where the lens barrel barriers 14 are opened and closed is provided with wall units 11d as the contact units. The wall units 11d forcibly drive the lens barriers 14 in the closing direction when the wall units 11d contact the corresponding convexes 14f (which will be described below) under a specific condition. The wall units 11d are provided so as to project toward the inner circumference side (a side getting close to the optical axis). Further, the wall units 11d are provided at two positions to match the respective lens barriers 14.

On the other hand, edge surfaces of the lens barriers 14, which are located adjacent to the inner circumference portion of the lens barrel member 11 in the opening state, are provided with the convexes 14f which project in an outer circumference direction. The convexes 14f contact the wall units 11d under the specific condition.

When the lens barrel member 11 is retracted from the advanced state and the barrier drive member 15 rotates in the clockwise direction, the lens barriers 14 move along moving paths of the rotational shafts 14a together with the barrier drive member 15. At the time, the lens barriers 14 rotate around the optical axis while contacting the inner circumference of the lens barrel member 11. Then, the wall units 11d and the convexes 14f contact each other before the rectilinear guiding units 13b of the rectilinear motion tube 13 come into the space where the lens barriers 14 operate, through the holes 11c provided in the lens barrel member 11. Thereby, the lens barriers 14 are forcibly rotated in the closing direction as illustrated in FIG. 7.

A moving amount by which the wall units 11d as the contact units moves the lens barriers 14 in contact with the convexes 14f of the lens barriers 14 in the direction of the barrier closing position should be at least equal to a moving amount by which the lens barriers 14 can retreat from the accommodation space which the rectilinear guiding units 13b come into. According to the present exemplary embodiment, the moving amount is set to an amount by which the lens barriers 14 can retreat from the accommodation space which the rectilinear guiding units 13b come into. Accordingly, the rectilinear guiding units 13b can be prevented from interfering with the lens barriers 14 when the rectilinear guiding units 13b come into the accommodation space.

As described above, the wall units 11d of the present exemplary embodiment would not contact the corresponding convexes 14f when the lens barriers 14 are in the barrier closing position. Further, the wall units 11d contact the corresponding convexes 14f when the lens barriers 14 are at the barrier opening position and the barrier drive member 15 is at the driving member closing position. The wall units 11d contact the corresponding convexes 14f of the lens barriers 14 while the lens barriers 14 are prevented from moving to the barrier closing position due to the biasing force of the barrier drive springs 17. On the other hand, when the lens barriers 14 can move to the barrier closing position owing to the biasing force of the barrier drive springs 17, the lens barriers 14 move to the barrier closing position while the wall units 11d do not contact the corresponding convexes 14f of the lens barriers 14.

It is desirable that the convexes 14f are provided at positions away from the rotational shafts 14a. This is because the contact between the wall units 11d and the convexes 14f generates larger torque for rotating the lens barriers 14 in the closing direction to securely allow the movement of the lens barriers 14, and an error in the moving amount in the closing direction caused by size variation is reduced. Therefore, the convexes 14f of the present exemplary embodiment are provided at positions away from the rotational shafts 14a.

As described above, according to the present exemplary embodiment, in the barrier device having the configuration in which the lens barriers 14 are supported by the barrier drive member 15, the lens barriers 14 can be forcibly closed when retracting the lens barrel member 11 even if the foreign material sticks to the lens barriers 14.

Therefore, in the lens barrel 10, the rectilinear guiding units 13b as parts of the other moving members come into the accommodation space for accommodating the lens barriers 14 when the lens barriers 14 are opened. And in a case where the barrier is closed, the lens barriers 14 are prevented from interfering with the rectilinear guiding units 13b, thereby avoiding mechanical malfunctions.

Further, since the wall units 11d contact the lens barriers 14 at the positions far away from the rotational shafts, a high torque in the closing direction can be obtained and the error in the moving amount in the closing direction caused by the variation in size becomes smaller, thereby enabling more secure driving of the lens barriers 14 in the closing direction.

The present invention is not limited to the above described exemplary embodiment, but may include various changes and modifications without departing from the spirit of the present invention.

(1) In the present exemplary embodiment, as an example, the lens barriers 14 are forcibly driven in the closing direction by the minimum moving amount required in order to avoid interference with the rectilinear guiding units 13b of the rectilinear motion tube 13. However, timing for forcibly rotating the lens barriers 14 by the wall units 11d provided on the lens barrel member 11 and a moving amount in the closing direction can be freely set according to the positions and the shapes of the wall units 11d. For example, the lens barriers 14 may be forcibly driven until immediately before the lens barriers 14 are completely closed.

(2) In the present exemplary embodiment, as an example, the wall units 11c as the contact units are provided on the lens barrel member 11. However, the present invention is not limited thereto. For example, the contact units contacting the lens barriers 14 may be provided on members other than the lens barrel member 11 which is a part of the lens barrel.

(3) In the present exemplary embodiment, the digital camera is described as an example. However, an embodiment is not limited thereto and may be replaced with a film camera, a video camera, or the other kinds of imaging apparatus such as a monitoring camera.

(4) In the present exemplary embodiment, the barrier device includes two lens barriers 14 as an example. However, an embodiment is not limited thereto. For example, the lens device may include another pair of lens barrier having different shapes, i.e., the barrier device may include total four lens barriers.

The present exemplified embodiment may be combined with the modifications thereof, as required, but the detailed description thereof will be omitted here.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-232879 filed Sep. 11, 2008, which is hereby incorporated by reference herein in its entirety.

What is claimed is:

1. A lens barrel comprising:
   an imaging optical system;
   lens barriers configured to move between a barrier closing position at which the lens barriers cover a photographing opening arranged on an optical axis of the imaging optical system and a barrier opening position at which the lens barriers are retreated from the photographing opening;
   a barrier drive member configured to rotatably support the lens barriers, and rotate around the optical axis so as to move between a driving member closing position at which the lens barriers are positioned at the barrier closing position and a driving member opening position at which the lens barriers are positioned at the barrier opening position;
   a lens barrel member configured to rotatably hold the barrier drive member between the driving member opening position and the driving member closing position; and
   contact units configured to be free from the lens barriers when the lens barriers are positioned at the barrier closing position, and to move the lens barriers in a direction of the barrier closing position in contact with the lens barriers when the lens barriers are positioned at the barrier opening position and the barrier drive member is positioned at the drive member closing position.

2. The lens barrel according to claim 1, wherein the contact units are provided on the lens barrel member.

3. The lens barrel according to claim 1, further comprising:
   moving members configured to move relatively in an optical direction with respect to the lens barrel member and come into at least a part of the accommodation space when the barrier drive member is in the driving member closing position;
   wherein the lens barrel member is formed into a shape capable of securing an accommodation space where the lens barriers are accommodated when the lens barriers are positioned at the barrier opening position; and
   wherein a moving amount by which the contact units move the lens barriers in a direction of the barrier closing position in contact with the lens barriers is at least a moving amount by which the lens barriers are retreated from the accommodation space which the moving members come into.

4. The lens barrel according to claim 3, wherein, when the barrier drive member moves from the driving member opening position to the driving member closing position, the retreat of the lens barriers from the accommodation space while the contact units contact the lens barriers, occurs prior to time when the moving members come into the accommodation space.

5. The lens barrel according to claim 1:
wherein barrier drive springs for biasing the lens barriers in the direction of the barrier closing position are provided between the lens barriers and the lens barrel member;
wherein the lens barriers are configured to move to the barrier closing position subject to the biasing force of the barrier drive springs as the barrier drive member moves to the driving member closing direction; and wherein the contact units contact the lens barriers when the lens barriers are prevented from moving to the barrier closing position due to the biasing force of the barrier drive springs.

6. An imaging apparatus comprising:
a lens barrel according to claim 1; and
an image capturing unit configured to capture an object image formed by the lens barrel.

* * * * *